United States Patent [19]

Blue

[11] 3,976,501
[45] Aug. 24, 1976

[54] PROCESS FOR CLEANING AND POLISHING A FLOOR

[76] Inventor: Maurice R. Blue, 60960 Crown Court, South Bend, Ind. 46614

[22] Filed: Sept. 18, 1974

[21] Appl. No.: 507,005

[52] U.S. Cl. .................................. 134/10; 134/40
[51] Int. Cl.² ........................................... B08B 7/04
[58] Field of Search ............ 134/10, 40; 260/29.6 R, 260/29.6 RB, 29.6 RW

[56] References Cited
UNITED STATES PATENTS

| | | | |
|---|---|---|---|
| 3,079,285 | 2/1963 | Rockwell | 134/10 |
| 3,308,078 | 3/1967 | Rogers et al. | 260/29.6 RW |
| 3,753,777 | 8/1973 | Thomsen et al. | 134/10 |
| R27,140 | 6/1971 | Kay et al. | 260/29.6 RW |

*Primary Examiner*—Arthur D. Kellogg
*Attorney, Agent, or Firm*—Woodhams, Blanchard and Flynn

[57] ABSTRACT

A floor polish composition comprising a film-forming water-insoluble emulsion copolymer and an alkali-soluble binder resin is stripped from the floor, then filtered to remove impurities such as soil therefrom and then is reapplied to the floor. The floor polish composition contains a non-fugitive antibacterial agent or agents to minimize bacterial growth in the composition.

5 Claims, No Drawings

PROCESS FOR CLEANING AND POLISHING A FLOOR

BACKGROUND OF THE INVENTION

1. Field of the Invention

This invention relates to a method of cleaning and polishing floors and to a composition for use in that method.

2. Description of the Prior Art

It is known to employ self-polishing floor polish compositions comprising an aqueous dispersion of a film-forming water-insoluble emulsion copolymer, together with a small amount of a resin which can be solubilized in water by the use of an alkali, such as ammonia. The resin acts as a binder for the copolymer material when a film of the floor polish composition is applied to a floor and dried. These compositions also contain various additive materials such as solvents, plasticizers, leveling agents and the like. Films of these compositions can be stripped from floors by using a stripping solution containing the alkali which resolubilizes the resin to cause break-up of the film.

The prior floor polish compositions of this type are intended for only one application to floors and they are discarded after they are stripped from the floors. Although this is not a serious economic disadvantage for household uses, the cost of floor polish compositions is a significant expense for commercial floor cleaning and polishing service organizations, because such organizations treat large floor areas at frequent intervals so that the cost of expendible supplies is a substantial proportion of the total floor care expense.

Heretofore it has been considered to be necessary to discard dirty floor polish compositions stripped from floors because they are heavily contaminated with soil and bacteria and they are not suitable for reuse.

SUMMARY OF THE INVENTION

According to the present invention, there is provided a process for cleaning and polishing floors in which a floor coated with a dry film of an alkali-removable, floor polish composition is treated with a liquid containing a volatile alkaline solubilizing agent, such as an aqueous ammonium hydroxide solution, capable of dissolving the binder resin whereby to break up the film and to free it from its adhering relationship to the floor. The thus-treated floor polish composition, including any soil present therein, becomes dissolved and/or suspended in the liquid containing the volatile solubilizing agent. This solution and/or suspension is removed from the floor and is forwarded through a filter having a hole or pore size of about 1 micron or less whereby to filter and remove from the solution and/or suspension all solid particles having a size of more than about 1 micron. This removes from the liquid essentially all the dirt that became present in the floor polish composition during its prior period of use on the floor. Thus, the filtrate from the filtering step consists essentially of purified recycled floor polish composition dissolved and/or suspended in the liquid containing the volatile alkaline solubilizing agent. This filtrate is reapplied to the floor. The liquid vehicle and the volatile alkaline solubilizing agent evaporate whereby to form on the floor another adherent film of the same floor polish composition, but which composition has been cleaned before it is reapplied. The invention is well adapted for performance using conventional commercial floor cleaning machines, such as the Clarke-A-Matic floor maintainer available from Clarke Floor Machine Division of Studebaker Corporation of Muskegon, Mich. and the Convertamatic floor maintainer available from Advance Floor Machine Company of Spring Park, Minn. Such machines conventionally employ various arrangements of rotatable brushes or pads, squeegees and pumps for supplying a liquid from a first self-contained tank to floors, scrubbing the floors and then picking up liquid from the floor and feeding it into a second self-contained storage tank in the floor cleaning machine. By modifying such conventional floor cleaning machines to incorporate therein a filter having a pore size of about 1 micron or less, together with associated conduits, pumps, etc., arranged in series between the second storage tank and the first storage tank, such machines can be converted to carry out the process of this invention. Thus the liquid solution and/or suspension removed from the floor, and stored in the second storage tank can be flowed through the filter and the filtrate therefrom can be flowed into the first storage tank in condition for reapplication to the floor.

In a preferred mode of operation, according to the invention, the clean liquid floor polish composition in the first tank of the machine is fed therefrom onto the floor in close proximity to the brushes or pads. The scrubbing action of the brushes or pads in conjunction with the freshly applied floor polish composition which contains an alkali such as ammonia, causes the existing dry floor polish on the floor to become dissolved in the freshly applied liquid floor polish composition so that, at this time under the machine, there exists a layer of a liquid mixture of (a) freshly applied floor polish composition and (b) re-solubilized old floor polish composition. As the machine is advanced along the floor, the liquid layer comes into contact with the squeegee at the back of the machine. The squeegee permits a thin film of the liquid mixture to remain on the floor and this film dries rapidly to form a new dry polish layer on the floor. The excess liquid that is scraped off by the squeegee is sucked up by a vacuum pump and is fed into the second storage tank. The liquid in the second tank is filtered, as described above, and then it is flowed into the first tank for reuse.

It will be noticed that the entirety of previously applied floor polish composition is not removed and fed into the second storage tank; rather, a part of it is reapplied, without being filtered, to the floor together with some clean liquid floor polish composition. The remainder of the previously applied floor polish composition is fed into the second storage tank together with the remainder of the clean liquid floor polish composition. Thus, only a part of the old floor polish is removed and cleaned. Experiments have shown that this is adequate and highly satisfactory when carried out as part of a routine floor maintenance program wherein the floor is treated at regular intervals so as to prevent excessive accumulation of soil in the floor polish.

Variations of this procedure are possible to meet special requirements. For example, if it is desired to provide a longer time of contact between the previously applied floor polish composition and the fresh floor polish composition, then the operator can make one pass of the machine as described above, but with the squeegee raised and the vacuum pump off, so that no liquid is picked up and fed into the second tank. This leaves the floor quite wet and insures adequate dissolving of the old floor polish. Then the operator can make a second pass over the floor, with the squeegee down and the vacuum pump on, and while applying more fresh floor polish composition if needed. The second pass removes the excess liquid and forms a new thin film of floor polish on the floor as above described.

In accordance with this invention, the pH of the liquids in both the first tank and the second tank is maintained in the range of about 9.0 to 9.5. The liquid is maintained in an essentially closed system in the floor cleaning machine during storage and filtration thereof so as to minimize evaporation therefrom of the volatile alkaline solubilizing agent. It may be necessary to add "make-up" volatile alkaline solubilizing agent to the liquid from time to time in order to compensate for the amount thereof that is lost by evaporation, including the amount evaporated when the cleaned recycled floor polish composition is reapplied to the floor and is dried. This can be accomplished by feeding a metered amount of fresh solubilizing agent, for example aqueous ammonium hydroxide solution, in response to the amount thereof that is present in the cleaned recycled floor polish reapplied to the floor. If desired or necessary, the maintenance of appropriate pH conditions of the liquid can be continuously monitored by a pH meter on the floor cleaning machine.

Likewise, make-up fresh floor polish composition can be added to the machine as needed to maintain proper liquid levels for effective operation. Also, it may be necessary to replace the entire amount of floor polish composition from time to time, depending on the conditions of use thereof, if it becomes impossible to clean same to an acceptable degree by the above-described filtration procedure. However, it should be possible to recycle the floor polish composition at least several times, according to the process of this invention, before replacement will be needed.

The maintenance of the pH level at a value in the range of about 9.0 to 9.5 is important because it ensures not only that the cleaned recycled floor polish composition will be suitable for reapplication to the floor, but also that bacterial growth therein will be minimized.

It is inevitable that floor polish compositions will pick up bacteria during their use on a floor. Such bacteria can cause deterioration of the floor polish compositions and create slimes, sludges and other difficulty filterable substances. The maintenance of relatively highly alkaline pH conditions in the liquid in the floor cleaning machine inhibits the growth of many of such bacteria whereby to reduce the rate of deterioration of the liquid floor polish.

In addition, there is incorporated in the floor polish composition a non-volatile bacteriostatic agent soluble in the liquid containing the volatile alkaline solubilizing agent and compatible with the ingredients of the floor polish composition, i.e., a bacteriostatic substance or combination of substances that will remain in the floor polish composition while it is on the floor and during its treatment in accordance with this invention, so as to inhibit growth of bacteria that become present therein. There are a wide variety of antibacterial agents useful for this purpose. The amounts thereof effective to inhibit growth of bacteria in floor polish compositions depends on the particular bacteriostatic agent used and the conditions of use of the floor polish composition, but in general such bacteriostatic agents are used in amounts of about 0.05 to 0.5 weight percent, based on the weight of the floor polish composition as hereinafter described. It will be understood that determination of the specific amounts of bacteriostatic agent needed in any specific installation can be determined by routine experimentation following the guidelines set forth above.

The bacteriostatic agent must be effective under the conditions of use, that is, under alkaline conditions, and it should be free of any physical or chemical incompatibilities with the other ingredients of floor polish composition. It should not alter the pH of the floor polish composition. It should be soluble in the floor polish composition in the weight range of 0.05 to 0.5 weight percent. It should be stable and capable of sustained action. It should be colorless and odorless, or nearly so, and it should be without toxic effects under the conditions of use.

A wide variety of known bacteriostatic agents are useful for the purposes of this invention. There can be used bis(hydroxyphenyl)alkanes, such as hexachlorophene and bithional; polybrominated salicylanilides, such as 3,4',5-tribromosalicylanilides with or without 3,5-dibromosalicylanilide; p-hydroxybenzoate esters, such as the methyl, ethyl, propyl or butyl esters of p-hydroxybenzoic acid; quaternary ammonium compounds, such as 1-(3-chloroallyl)-3,5,7-triaza-1-azoniaadamantane chloride (Dowicil 100); organomercurials, such as phenylmercuric acetate; organo-tin compounds, such as bis(tri-n-butyltin)oxide; formaldehyde and formaldehyde releasing compounds; phenolics, such as sodium o-phenylphenate; benzylbromo acetate; zinc pyrithione; and halogenated carbanilides, such as 3,4,4'-trichlorocarbanilide and 4,4'-dichloro-3-(trifluoromethyl) carbanilide.

It is especially preferred to use, as the bacteriostatic agent, 1-(3-chloroallyl)-3,5,7-triaza-1-azonia-adamantane chloride (Dowicil 100).

The floor polish composition according to the present invention is a stable aqueous composition containing from about 5 to about 40 percent by weight of solids and additives consisting essentially of 1. from about 54 to 85 percent by weight of a polymeric film former, preferably a water-insoluble addition polymer obtained by emulsion polymerization of at least one monoethylenically unsaturated monomer and about 1 to 18 percent by weight of an $\alpha,\beta$-monoethylenically unsaturated acid,
2. from about 10 to 30 percent by weight of an alkali-soluble resin, preferably a copolymer of styrene and maleic anhydride having a molecular weight of about 500 to 8000,
3. from about 9 to about 22 weight percent of a leveling aid and/or gloss improver, preferably a lactam,
4. ammonia or water-soluble volatile organic amine in an amount sufficient to give the composition a pH in the range of 9.0 to 9.5,
5. an effective amount of non-volatile bacteriostatic agent for preventing bacterial growth in the composition during storage, application and floor polishing use of the composition, the percentages being based on the total nonaqueous components of the composition, the solids in said composition all critically having a particle size of not more than $1\mu$.

In addition, the floor polish composition can contain small amounts generally in the range of 4 to 8 weight percent, based on the total nonaqueous components of the composition, of various solvents, plasticizers, leveling agents and the like. It is preferred to use from 1 to 2 weight percent of tributoxyethyl phosphate and 3 to 6 weight percent of Carbitol and/or ethylene glycol.

The balance of the composition consists essentially of water.

The water-insoluble addition polymer can be obtained by emulsion polymerization of one to more monoethylenically unsaturated monomers including acrylic acid esters of acrylic or methacrylic acid wherein the alcohol moiety of the ester is derived from benzyl alcohol, phenol, or a saturated monohydric aliphatic alcohol, especially an anlkanol having 1 to 18 carbon atoms, such as cyclopentanol, cyclohexanol, methanol, ethanol, n-propanol, isopropanol, n-butanol, isobutanol, sec-butanol, tert-butanol, any of the pentanols, hexanols, octanaols, decanols, dodecanols, hexadecanols, and octadecanols. Preferred polymers are copolymers containing at least one of these esters of acrylic acid with one or more monomers selected from the group consisting of ($C_1$–$C_4$)-alkyl methacrylates, acrylonitrile, methacrylonitrile, vinyl acetate, styrene, vinyltoluene (o,m, or p), vinyl chloride or vinylidene chloride. In place of part or all of the acrylic acid ester component, the preferred type of polymer may contain a ($C_5$–$C_{18}$)-alkyl methacrylate. Blends of these copolymers may be used. The polymers may also by graft copolymers.

The polymerization systems most often employed to produce the polymeric film-former used in the composition of the present invention are those systems wherein addition polymerization (including co- or interpolymerization) is effected in the presence of an emulsion polymerization catalyst, emulsifiers and water. These systems have the advantage of preparing an already emulsified polymeric film-former, which emulsion, after treatment, say, to remove or quench unexpired catalyst, may be used directly in formulating the coating composition. Ordinarily, the high molecular weight film-forming polymers have a molecular weight of about 10,000 to 500,000, preferably about 20,000 to 200,000, and are preferably in a finely-divided form, that is, characterized by a particle size in the emulsion of about 0.2 to 1 micron, most preferably about 0.4 to 0.6 micron.

The polymers contain from 1 to 18 percent of an $\alpha,\beta$-monoethylenically unsaturated acid, such as maleic, fumaric, aconitic, crotonic, acrylic, methacrylic, or itaconic acid, the latter three being preferred, for the purpose of making the coatings deposited therefrom readily removable by the application of alkaline media, such as dilute aqueous ammonia.

While numerous polymers may be used as the leveling resin, the styrene-maleic anhdyride copolymer which can provide the leveling resin component of the invention is preferred. The resin is relatively low in molecular weight, having about 1 to 5, preferably about 1 to 3, moles of styrene per mole of maleic anhydride and molecular weight of about 500 to 8,000, preferably about 1200 to 5000. These materials are commercially available and can be prepared by methods known in the art.

The alkali-soluble leveling resins include the low molecular weight copolymers of styrene and maleic anhydride which have been partially esterified, e.g. about 50 to 100, preferably about 60 to 75, percent half-esterified with an aliphatic, including cycloaliphatic, monohydric alcohol of 1 to about 6, preferably 1 to about 3, carbon atoms. The esterified copolymers often have an acid number (determined as milligrams of KOH required to neutralize one gram of partially esterified copolymer) of about 175 to 325, preferably about 180 to 250. Preferred esterifying alcohols are monohydric alkanols such as n-propanol, n-butanol, etc.

Esters of the styrene-maleic anhydride copolymer, useful in the alkali-soluble form of the invention, can be prepared by reacting the monohydric alcohol with the copolymer under either bulk or solvent conditions. The reaction temperature may vary depending upon whether a solvent is used, the styrene to maleic anhydride ratio in the copolymer, the particular alcohol employed, etc. Generally, esterification reaction temperatures of about 320° to 400°F., often about 340° to 360°F., can be employed. Advantageously, an esterification catalyst such as lithium acetate can be employed.

In addition to these particular leveling resins, it is to be understood that other leveling resins can be used as well. Thus, blends of the reacted styrene-maleic anhydride copolymer with, for example, rosin-maleic anhydride polyol leveling resin or rosin derivatives alone, addition polymers of acrylic acid with styrene, etc., can be used, see U.S. Pat. No. 3, 308, 078 for further examples.

The coating compositions of the present invention contain one or more leveling aids or gloss improvers. Preferably, ε-caprolactam is employed to give superior leveling characteristics and was used in the specific examples described hereinafter. The lactam can further improve gloss, water resistance and recoatability, and is generally added in minor amounts, but sufficient to improve one or more of these characteristics. The leveling aid-gloss improver is generally a lactam of 4 to 6 carbon atoms in the ring. The lactam can be characterized by the formula:

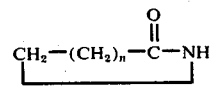

wherein $n$ is 2 to 4 and nondeleterious substituents, e.g. lower alkyl groups, may be substituted on the ring.

In the present invention, the lactam may be the final component added to the emulsion, or may be premixed with the leveling resin, when present, and the mixture added at the normal time of addition for the resin. Any other suitable time of addition may be used but the preferred time may depend on the components of the emulsion being prepared. The optional addition of other conventional leveling aids such as 2-pyrrolidone and tributoxyethyl phosphate can also be effected, for instance, after the copolymer has been added.

The floor polish composition also contains ammonia or a water-soluble volatile organic amine to give a final pH of the composition in the range of 9.0 to 9.5. For example there can be used from about 0.5 to 1.5 weight percent of ammonium hydroxide aqueous solution (28 wt.%). There can also be used equivalent amounts of water-soluble volatile amines, typical ones of which are mono-, di- or tri- alkyl C1–C3) amines, monoalkyl (C4–C12) amines, morpholine and mono-, di- or tri-ethanolamines.

All non-dissolved ingredients of the floor polish composition have a particle size of less than 1 micron, so that they are not removed by the filtration operation. Specifically the polymeric film former (emulsion) has a particle size of less than $1.0\mu$. The other ingredients of the composition are dissolved or emulsified therein.

The invention will be further described by reference to the following examples:

EXAMPLE 1

The following polish composition is prepared.

| | | Parts by weight |
|---|---|---|
| (1) | deionized water | 48.5 |
| (2) | Lucidene III (Morton Chemical Corp) (a commercial acrylic emulsion of methylemethacrylate-ethyl acrylate-methacrylic acid terpolymer) | 24.5 |
| (3) | SMA 2625 (Acro Chemical) (a commercial half-ester of a copolymer of 1:4 styrene-maleic anhydride having a molecular weight of 1600–2500) | 20 |
| (4) | ε-caprolactam (50% solution) | 6 |
| (5) | ammonium hydroxide (28% solution) | 1 |
| (6) | tributoxyethyl phosphate | 1 |
| (7) | Carbitol | 3.5 |
| (8) | Dowicil "100" | 0.3 |

Components (1) to (5) are mixed and stirred and then components (6) to (8) are mixed and stirred. The composition has a pH of about 9.3. The composition is applied to a supermarket floor at a rate of about 2000 ft²/gal. The floor is examined and the leveling, gloss and water resistance of the polish film are all rated excellent. After two days commercial use of the floor, the floor is treated by applying fresh polish composition using a commercial Clarke-A-Matic, Model TB-32A machine whereby to form a new floor polish film consisting of part of the old film and part of the fresh polish composition. The liquid composition drawn into the second tank of the machine is then filtered through a filter having a pore size of $1\mu$, and then is reapplied to the floor. The floor is examined and the above noted properties are still rated excellent. It is found that the composition can be cleaned and reapplied in like fashion about 5 times before there occurs a noticeable deterioration of the film properties.

EXAMPLE 2

The following polish composition is prepared.

| | | Parts by weight |
|---|---|---|
| (1) | deionized water | 42 |
| (2) | Lucidene III | 28 |
| (3) | SMA 17352 (Arco Chemical) | 25 |
| (4) | ε-caprolactam (50% solution) | 4 |
| (5) | ammonium hydroxide (28% solution) | 1 |
| (6) | tributoxyethyl phosphate | 1.5 |
| (7) | Carbitol | 6 |
| (8) | Dowicil 100 | 0.30 |

When prepared and tested in the same manner as described in Example 1, this composition showed similar properties.

Although the foregoing description has referred to a preferred procedure using a commercial floor maintaining machine equipped to carry out the filtration step of the method according to the present invention, it will also be understood that the method of the invention is not limited to this specific procedure. For example, the filtration of the stripped floor polish composition can be carried out using a separate filtration unit which is not part of the floor maintaining machine.

While certain preferred embodiments of the invention have been described, it is understood that the invention is not limited thereto as many variations and modifications will be readily apparent to those skilled in the art.

I claim:

1. A process for cleaning and polishing a floor, which comprises the steps of: providing in a first tank in a floor cleaning machine a supply of a liquid floor polish composition comprising a film-forming water-insoluble emulsion copolymer, a binder resin dissolved in an aqueous solution of a volatile alkaline solubilizing agent and from 0.05 to 0.5 weight percent of a non-volatile bacteriostatic agent which is compatible with the other ingredients of the floor polish composition, which does not alter the pH of the floor polish composition, which is soluble in the floor polish composition in the range of from 0.05 to 0.5 weight percent, and which is stable, capable of sustained bacteriostatic action and is substantially odorless and colorless and is non-toxic and is selected from the group consisting of bis(hydroxyphenyl)alkanes, polybrominated salicylanilides, p-hydroxybenzoate esters, 1-(3-chloroallyl)-3,5,7-triaza-1-azoniaadamantane chloride, organomer-curials, organotin compounds, formaldehyde and formaldehyde-releasing compounds, phenolics, benzylbromo acetate, zinc pyrithione and halogenated carbanilides, and wherein the solids in said floor polish composition have a particle size of not more than one micron;

applying said liquid floor polish composition from said first tank to a floor coated with an adherent dry film of said floor polish composition and scrubbing said dry film with said liquid floor polish composition to break up said film and to free it from its adhering relationship to the floor whereby the film including soil present therein becomes mixed and is dissolved or suspended in the fresh liquid floor polish composition supplied from said first tank;

removing excess liquid from the floor, drying the liquid remaining on the floor to form another adherent dry film of said floor polish composition on said floor, and feeding the excess liquid to a second tank in said floor polishing machine, feeding the liquid from the second tank through a filter having a pore size of about one micron or less to filter and remove therefrom all solid particles having a particle size of more than one micron and obtaining a filtrate consisting essentially of cleaned liquid floor polish composition free of soil, and placing the filtrate in the first tank to serve as said liquid floor polish composition therein, the pH of the liquids being continuously maintained in the range of from 9.0 to 9.5 and the liquids being maintained under conditions effective to minimize evaporation of the volatile alkaline solubilizing agent.

2. A process as claimed in claim 1 including the step of monitoring the pH of said liquids in the floor cleaning machine and adding fresh aqueous solution of said volatile alkaline solubilizing agent to maintain the pH of said liquids in said range of 9.0 to 9.5.

3. A process as claimed in claim 1 in which said bacteriostatic agent is 1-(3-chloroallyl)-3,5,7-triaza-1-azoniaadamantane chloride.

4. A process as claimed in claim 1 in which the filter is provided on the floor cleaning machine between the first and second tanks, and the filter and the first and second tanks in the floor cleaning machine forming an essentially closed system to minimize evaporation of the volatile alkaline solubilizing agent.

5. A process as claimed in claim 1, in which said floor polish composition consists essentially of a stable aqueous composition containing from about 5 to about 40 percent by weight of solids and additives consisting essentially of
1. from about 54 to 85 percent by weight of a water-insoluble addition polymer obtained by emulsion polymerization of at least one monoethylenically unsaturated monomer and about 1 to 18 percent by weight of an α,β-monoethylenically unsaturated acid,
2. from about 10 to 30 percent by weight of an alkalisoluble copolymer of styrene and maleic anhydride having a molecular weight of about 500 to 8000,
3. from about 9 to about 22 weight percent of a leveling aid and/or gloss improver,
4. ammonia or water-soluble volatile organic amine in an amount sufficient to give the composition a pH in the range of 9.0 to 9.5,
5. an effective amount of non-volatile bactericide for preventing bacterial growth in the composition during storage, application and floor polishing use of the composition,
the percentages being based on the total nonaqueous components of the composition,
the solids in said composition all have a particle size of not more than 1μ.

* * * * *